United States Patent
Ohgishi (10) Patent No.: US 8,473,691 B2
(45) Date of Patent: Jun. 25, 2013

(54) MEMORY MANAGEMENT DEVICE, IMAGE FORMING APPARATUS, AND IMAGE FORMING METHOD

(76) Inventor: Ryosuke Ohgishi, Osaka (JP)

( * ) Notice: Subject to any disclaimer, the term of this patent is extended or adjusted under 35 U.S.C. 154(b) by 767 days.

(21) Appl. No.: 12/689,835

(22) Filed: Jan. 19, 2010

(65) Prior Publication Data
US 2010/0220359 A1 Sep. 2, 2010

(30) Foreign Application Priority Data

Feb. 27, 2009 (JP) .................................. 2009-045961
Apr. 6, 2009 (JP) .................................. 2009-092409

(51) Int. Cl.
*G06F 13/28* (2006.01)
*G06F 13/00* (2006.01)

(52) U.S. Cl.
USPC .............................. 711/147; 711/206; 710/22

(58) Field of Classification Search
USPC ..................... 710/22; 711/147–150, 206–209
See application file for complete search history.

(56) References Cited

U.S. PATENT DOCUMENTS

| | | | |
|---|---|---|---|
| 5,579,508 A | | 11/1996 | Yoshizawa et al. |
| 5,721,917 A * | | 2/1998 | Elliott et al. .................. 718/101 |
| 5,860,144 A * | | 1/1999 | Frank et al. .................... 711/206 |
| 6,003,112 A * | | 12/1999 | Tetrick ............................ 711/100 |
| 6,732,220 B2 * | | 5/2004 | Babaian et al. ..................... 711/6 |
| 6,826,671 B2 * | | 11/2004 | Ostrovsky et al. ............. 711/207 |
| 7,065,630 B1 * | | 6/2006 | Ledebohm et al. ........... 711/206 |
| 8,060,722 B2 * | | 11/2011 | Adams et al. ................. 711/206 |
| 2003/0063316 A1 | | 4/2003 | Irino |
| 2003/0177332 A1 | | 9/2003 | Shiota |
| 2004/0117587 A1 | | 6/2004 | Arimilli et al. |
| 2004/0237086 A1 * | | 11/2004 | Sekiguchi et al. ............. 718/100 |
| 2006/0026383 A1 * | | 2/2006 | Dinechin et al. .............. 711/207 |
| 2008/0082780 A1 | | 4/2008 | Tsuji |
| 2011/0161550 A1 * | | 6/2011 | Hulbert et al. ..................... 711/6 |
| 2011/0161620 A1 * | | 6/2011 | Kaminski et al. ............. 711/207 |
| 2012/0254577 A1 * | | 10/2012 | Okin et al. ..................... 711/165 |

FOREIGN PATENT DOCUMENTS

| | | |
|---|---|---|
| CN | 1506849 | 6/2004 |
| CN | 101154193 | 4/2008 |
| JP | 01-241649 | 9/1989 |
| JP | 03-257644 | 11/1991 |
| JP | 2000-276403 | 10/2000 |
| JP | 2003-248626 | 9/2003 |
| JP | 2004-355187 | 12/2004 |
| JP | 2005-028687 | 2/2005 |
| JP | 2005-250996 | 9/2005 |

* cited by examiner

Primary Examiner — Christopher Shin (57) ABSTRACT

A memory management device, an image forming apparatus, and an image forming method include an OS-management-memory-region managing unit configured to divide a physical memory space into a management region managed by an OS and a non-management region that is not managed by the OS, assign the management region to the virtual memory space, and acquire and/or free a memory space of the management region. The image forming apparatus includes an OS-non-management-memory-region managing unit assigning the non-management region to the virtual memory space so that an application program acquires and/or frees a memory space of the non-management region. The OS-management-memory-region managing unit includes a window region provided so that the OS refers to the non-management region. Data is read and/or written from and/or into the OS-non-management region via the window region.

13 Claims, 5 Drawing Sheets

FIG.1

FIG.2A  KNOWN MEMORY MAP

| 00 | 10 | 20 | | C0 | E0 | FF |
|---|---|---|---|---|---|---|
| PROG etc 256M | APL Max 256M | OS managed data area (OS-management-memory region) About 2.6G mmap malloc etc | | kernel 512M | I/O etc. 512M | |

FIG.2B  MEMORY MAP ACCORDING TO A FIRST EMBODIMENT OF THE PRESENT INVENTION

| 00 | 10 | 20 | | 80 | 94 | E0 | FF |
|---|---|---|---|---|---|---|---|
| PROG etc 256M | APL Max 256M | User managed data area (OS-non-management-memory region; accessible from the OS side) About 1.4G mmap malloc etc | | kernel 320M | WIND 1.2G (0.9 – 1.2G) | I/O etc. 512M | |

FIG.2C  MEMORY MAP ACCORDING TO A SECOND EMBODIMENT OF THE PRESENT INVENTION

| 00 | 10 | 20 | | C0 | D4 | E0 | FF |
|---|---|---|---|---|---|---|---|
| PROG etc 256M | APL Max 256M | User managed data area (OS-non-management-memory region ; accessible from the OS side) About 2.6G mmap etc | | kernel 320M | WIND 192M | I/O etc. 512M | |

ADDITIONAL NOTES    PROG : PROGRAM
                    APL : APPLICATION
                    WIND : WINDOW REGION

MEMORY MANAGEMENT DEVICE, IMAGE FORMING APPARATUS, AND IMAGE FORMING METHOD

INCORPORATION BY REFERENCE

This application is based upon and claims the benefit of priority from the corresponding Japanese Patent Application No. 2009-045961, filed Feb. 27, 2009, and Japanese Patent Application No. 2009-092409, filed Apr. 6, 2009, the entire contents of which are incorporated herein by reference.

BACKGROUND OF THE INVENTION

1. Field of the Invention

The present invention relates to a memory management device, an image forming apparatus, and an image forming method, and particularly relates to memory usage in a virtual memory system.

2. Description of the Related Art

Usually, under a virtual memory mapping scheme, physical memory handling is controlled by a mapping mechanism managed by an operating system (hereinafter referred to as an OS). Therefore, it is difficult for the user to handle the physical memory freely. Consequently, interprocess cooperation is not achieved so that the amount of memory that can be handled is limited.

When memory space is managed by the OS, repetitively using and freeing memory results in the memory being finely consumed so that fragmentation occurs in the memory region.

For example, in a device handling large-capacity image data, such as an image forming apparatus, it is difficult to define a sufficient memory region due to the occurrence of fragmentation. Therefore, successive large-capacity memories are defined with difficulty.

Consequently, the above-described configuration results in data being processed with low speed.

To address these difficulties, the following exemplary known technology presents a virtual memory system that can avoid low-speed data processing without consuming unnecessary physical memory for a page table.

Under such a system, an address conversion table generator is connected to a system bus and accessed by a central processing unit (CPU) when a translation look-aside buffer (TLB) mistake is made. Then, each time the CPU accesses the address conversion table generator, an appropriate page table entry is generated under a previously made rule.

Thus, the region of the memory may not be used by accessing the address conversion table generator. Further, the CPU can set the rule under which the address conversion table generator generates a page table.

However, the above-described method is a technology for reducing the consumption of the memory of the page table, and the amount of a memory region defined through the above-described method is significantly small.

Therefore, the above-described method is insufficient to define successive large capacity memory spaces used for image data handled by an image forming apparatus.

Further to the above-described known technology, an additional attempt to avoid low-speed data processing involves a memory-region management method for ensuring a virtual memory region managed by an OS and an image memory region provided to store image data managed by anything but the OS on a rewritable memory.

The above-described known technology allows for performing memory management appropriate for the architecture of the OS, and increasing the processing efficiency and the memory use efficiency.

However, even though the above-described memory region management can improve the processing speed, it is difficult to map the memory region managed by anything but the OS to virtual memory.

The present invention addresses shortcomings of known technologies to increase the efficiency with which a virtual memory system handles successive data items.

SUMMARY OF THE INVENTION

Accordingly, a memory management device according to an embodiment of the present invention has the following configuration.

The above-described memory management device includes an OS-management-memory-region managing unit configured to divide a physical memory space into a management region that can be managed by an OS and a non-management region that is not managed by the OS, assign the management region to the virtual memory space, and acquire and/or free a memory space included in the management region. Further, an image forming apparatus according to an embodiment of the present invention includes an OS-non-management-memory-region managing unit configured to assign the non-management region to the virtual memory space so that an application program acquires and/or frees a memory space included in the non-management region. Further, the OS-management-memory-region managing unit includes a window region provided so that the OS refers to the non-management region. Then, data is read from and/or written into the OS-non-management region of the physical memory space via the window region.

Further, an image forming apparatus according to an embodiment of the present invention includes the same configuration as that of the above-described memory management device.

Further, an image forming method according to an embodiment of the present invention includes the following configuration.

An image forming method according to an embodiment of the present invention includes an OS-management-memory-region managing step performed to divide a physical memory space into a management region that can be managed by an OS and a non-management region that is not managed by the OS, assign the management region to the virtual memory space, and acquire and/or free a memory space included in the management region. Further, the image forming method includes an OS-non-management-memory-region managing step performed to assign the non-management region to the virtual memory space so that an application program acquires and/or frees a memory space included in the non-management region. Further, the OS-management-memory-region managing step includes a window region managing step performed so that the OS refers to the non-management region. Then, data is read from and/or written into the OS-non-management region of the physical memory space via the window region management step.

Further features and advantages of the present invention will become apparent from the description of embodiments given below.

BRIEF DESCRIPTION OF THE DRAWINGS

FIGS. 3A-3C show exemplary memory use division according to an embodiment of the present invention, where

FIG. 4A is a flowchart showing memory management operations of initialization operations performed when power to an image forming apparatus (including a memory management device)is turned on;

DESCRIPTION OF THE PREFERRED EMBODIMENTS

Hereinafter, embodiments of the present invention will be described.

In known virtual systems, an OS manages memory space, making it difficult to acquire successive large-capacity memories due to, for example, fragmentation caused by restrictions on the capacity of memory for acquisition, or an operation performed to acquire and/or free memory managed by the OS. However, the above-described problem can be solved by (1) dividing a physical memory space into an OS-management memory region and an OS-non-management memory region that are allocated to a virtual memory space and (2) providing an OS-non-management memory region managing unit that allows an application program to access the OS-non-management region.

The memory management device of the present invention includes configurations as described in first embodiment or an OS-management-memory-region managing unit and an OS-non-management-memory-region managing unit.

The image forming apparatus of the present invention includes the memory management device of the present invention and various configurations in the following embodiment.

First Embodiment

Figure 2A:
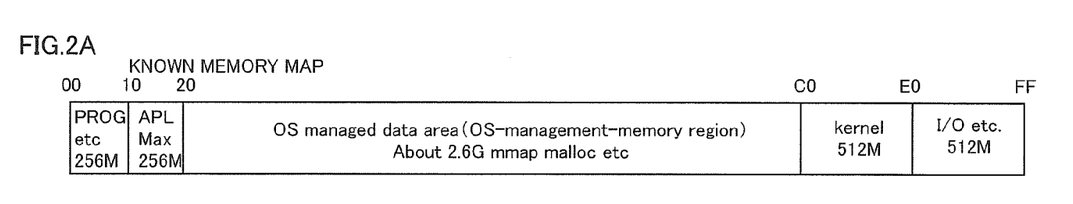
FIG. 2A shows a memory map according to an embodiment of the present invention, wherein the entire memory region except a known exemplary I/O data buffer or the like is managed by an OS.
Figure 2B:
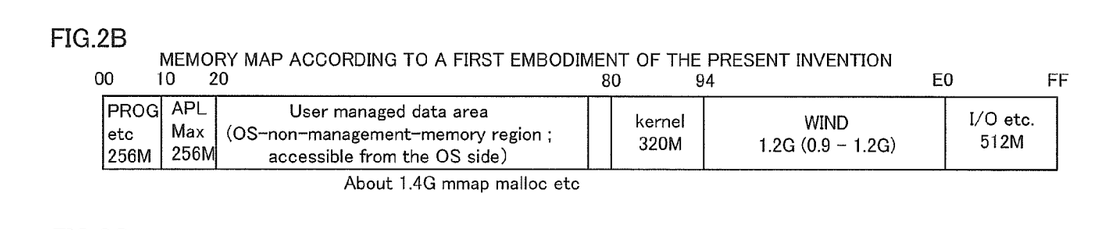
FIG. 2B shows a memory map according to a first embodiment of the present invention, wherein the memory map is generated according to a memory management method using a window region that is used for data reference.

The virtual memory system provided by the memory management device according to a first embodiment of the present invention will be described with reference to a known memory map (FIG. 2A) and a memory map according to the first embodiment (FIG. 2B). Since the configurations of functional blocks and the flow of operations of the first embodiment are generally equivalent to those of a second embodiment of the present invention, the configurations and the operation flow of the second embodiment alone will be described.

Figure 2C:
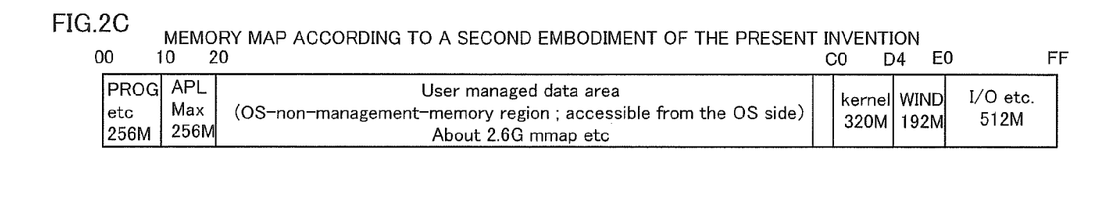
FIG. 2C is a memory map according to a second embodiment of the present invention, wherein a size appropriate for DMA-transferring data from a scanner is ensured and a window region is reduced to the minimum.

In each of FIGS. 2A, 2B, and 2C, "PROG", "APL", and "WIND" are respective abbreviations for a program, an application, and a window region.

In each of FIGS. 2A, 2B, and 2C, an address space falls within a range expressed in 32 bits, and addresses of the high order 8 bits are expressed in hexadecimal, such as "00" to "FF". The remaining 24 bits are omitted, because each of the remaining 24 bits is "0".

FIG. 2A shows a memory map provided when the entire memory region except a known input-and-output (I/O) data buffer is managed by the OS. In that case, a user is usually able to sufficiently handle a virtual space. However, since the entire memory region is managed by the OS, it is difficult to dynamically define successive regions such as a direct-memory-access (DMA) transfer region. Further, memory is acquired and/or freed repeatedly under OS management so that fragmentation occurs, making it difficult for the user to obtain a large-capacity memory region.

Therefore, the present invention provides a DMA transfer dedicated region obtained from a physical memory and used as a common memory that is not managed by the OS.

The memory management device of the first embodiment has a window region ("WIND" in FIG. 2B), which is an independent region provided to refer to a memory region that is not managed by the OS, as shown in the memory map of FIG. 2B.

In the memory management device, a physical memory space is divided into a management region that can be managed by the OS and a non-management region that is not managed by the OS. The memory management device includes an OS-management-memory-region managing unit that assigns the management region to a virtual memory space and that can acquire and/or free a memory space included in the management region, and an OS-non-management-memory-region managing unit (IOMEM) that assigns the non-management region to the virtual memory space and that allows an application program to acquire and/or free a memory space included in the non-management region. Further, in the memory management device, a virtual address space is divided into a management region and a non-management region (hereinafter referred to as a common memory).

According to the above-described configuration, however, there is no means to access an address space of the non-management region (common memory) from the OS side (Kernel). Therefore, according to the first embodiment, a window (WIND) region attained by mapping a physical memory to a region displaced from the kernel physical space by as much as a predetermined offset (1.2 GB from 0x94000000 to 0xE0000000 as shown in FIG. 2B) is provided so that the kernel can handle the address space of the management region (hereinafter referred to as the Kernel space) and that of the non-management region (hereinafter referred to as the user space).

Providing the above-described window region allows for debugging from the kernel space, performing a cache flush operation so as to reflect data written through a user process, and transferring data through a CPU without using DMA with facility.

Second Embodiment

A memory management system used in an image forming apparatus according to a second embodiment of the present invention will be described below.

According to a memory management system used in the memory management device of the first embodiment, the window region is considerably large—up to 1.2 gigabytes (GB). As a result, a region that can be used by the user of the virtual space is put under a considerable pressure.

Therefore, referencing data stored in the common memory in the kernel space is minimized so that only predetermined information is acquired and/or freed as appropriate. Consequently, the window region is reduced. More specifically, a window region (192 MB from 0xD4000000 to 0xE0000000) is generated as shown in FIG. 2C. Therefore, it becomes possible to ensure a sufficiently large user space. This is the case even while using memory for transferring data through DMA and for other purposes.

In the second embodiment, a memory region assigned to the user (user space) according to the following method is ensured.

(1) A common memory of a size clearly showing that the common memory is intended to be shared among processes in advance when the OS is initialized is defined in a region that is not managed by the OS.

(2) The above-described memory provided outside the management region can be mapped to the user space without being limited by the OS so that sufficient memory can be ensured when obtaining memory from the user space. Further, since the memory is not managed by the OS, the memory can be mapped to a larger space.

(3) The above-described region not managed by the OS accordingly was the virtual memory with higher efficiency, thereby reducing the size of a kernel virtual region provided to directly read data stored in a physical memory. However, a physical memory defined in the area not managed is mainly assigned to a region limited only for hardware access such as DMA. Since data assigned to the above-described region is hardly referred to, there are few demerits of the above-described expansion.

Further, since the window region is reduced to a minimum, it becomes possible to access the user space (OS-non-management region) from the kernel side, as is the case with the first embodiment. Since the window region of the second embodiment is smaller than that of the first embodiment, a sufficient amount of memory can be ensured in the user space.

The minimum size of the window region depends on properties of the image forming apparatus. The minimum amount of the window region to which the device directly DMA-accesses is determined based on a size or the like appropriate to DMA-transfer data from a scanner provided in the image forming apparatus.

Further, when referencing the DMA-transferred data through a user application, cache invalid processing is performed to synchronize a CPU cache and real memory. The window region is provided to perform the cache invalid processing as a virtual address. If no window region is provided, the window region should be dynamically defined and freed so as to maintain coherency, which affects the processing performance. For avoiding the above-described problem, a region for coherency should be defined in the window region in advance.

The minimum size of the window region is determined based on the region provided to execute the above-described DMA transfer and the region used to perform cache invalid processing so as to maintain the cache coherency.

Figure 3A:
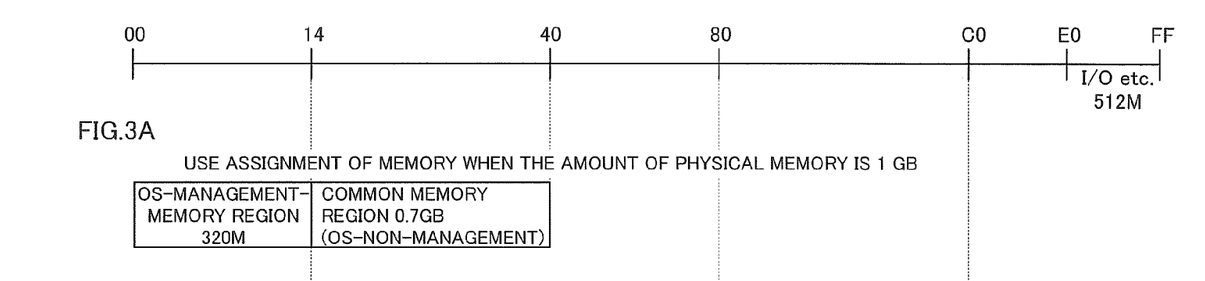
FIG. 3A shows exemplary memory use division attained when physical memory according to an embodiment of the present invention is 1 GB.
Figures 3B, 3C:
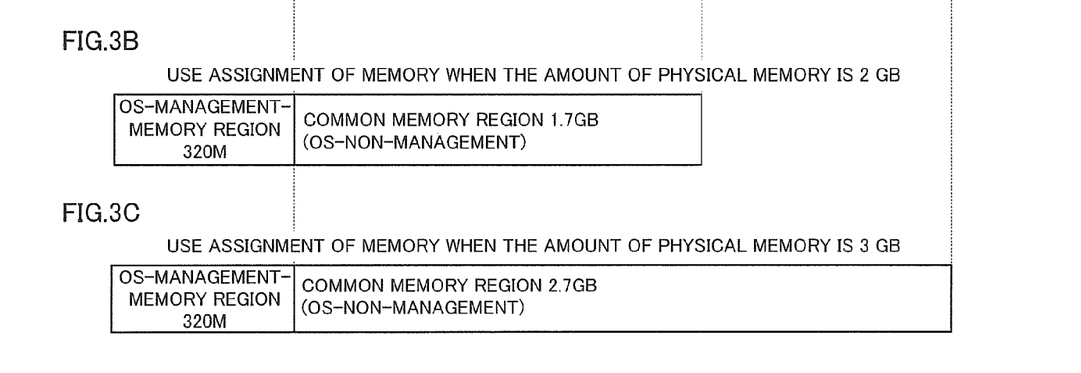
FIG. 3B shows exemplary memory use division attained when the physical memory according to the above-described embodiment is 2 GB.
FIG. 3C shows exemplary memory use division attained when the physical memory according to the above-described embodiment is 3 GB.

The example memory maps shown in FIGS. 3A-3C illustrate that a common memory region (OS-non-management region) can be increased by reducing the window region to the minimum, as is the case with the second embodiment.

FIG. 3A shows the use assignment of memory when the amount of physical memory is 1 GB. FIG. 3B shows the use assignment of memory when the amount of the physical memory is 2 GB. FIG. 3C shows the use assignment of memory when the amount of the physical memory is 3 GB.

When the amount of the physical memory is 1 GB and/or 2 GB, the window region exists at the memory address 0x80000000 or later so that redundancy of addresses does not occur. In that case, no problem occurs even though the size of the window region is 1.2 GB, as is the case with the first embodiment, or 192 MB, as is the case with the second embodiment.

However, if the amount of the physical memory is 3 GB as shown in FIG. 3C and the window region is started from the memory address 0x94000000, as is the case with the first embodiment, the window region and the memory region that is not managed by the OS overlap with each other, which makes it difficult to use the entire common memory.

However, in the second embodiment, the window region is reduced to the minimum and the start address is determined to be 0xD4000000. Namely, the start address is assigned so that the start address exists at the final address or later of the memory, which is 0xC0000000.

Consequently, the address redundancy does not occur so that the size of the memory region managed by the OS becomes as large as 320 MB and that of the memory region which is not managed by the OS becomes as large as 2.7 GB, as shown in Part 3C of FIG. 3.

Therefore, the above-described embodiment is effective to use a large amount of data, as is the case with image data used for an image forming apparatus.

Hereinafter, an image forming apparatus (memory management device) according to the second embodiment will be described.

Figure 1:
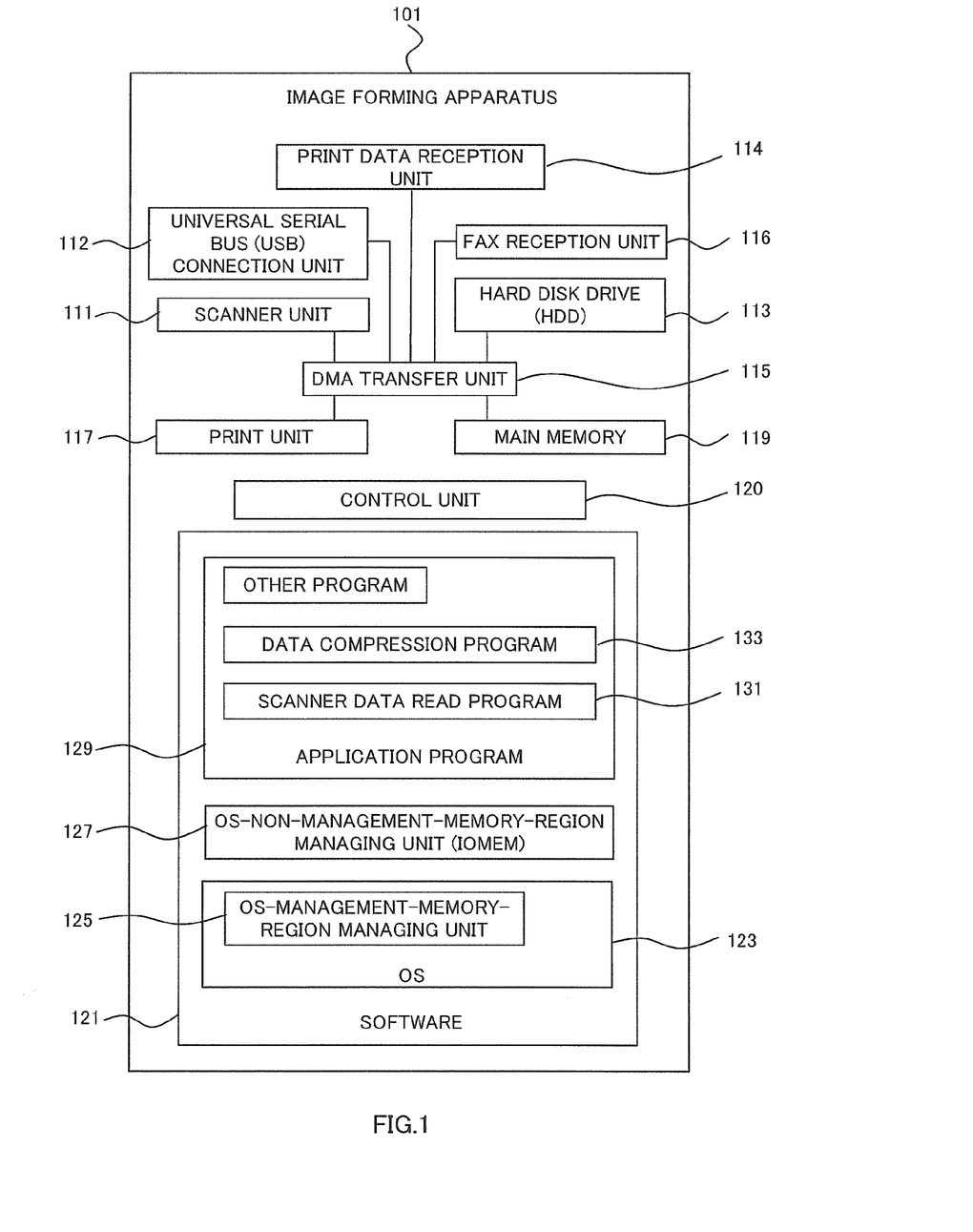
FIG. 1 is a functional block diagram of an image forming apparatus (including a memory management device) according to an embodiment of the present invention.

FIG. 1 shows a functional block diagram of an image forming apparatus 101.

The image forming apparatus 101 includes a scanner unit 111, a universal serial bus (USB) connection unit 112, a hard disk drive (HDD) 113, a print data reception unit 114, a DMA transfer unit 115, a FAX reception unit, a print unit 117, a main memory 119, a control unit 120, software 121, an OS 123, an OS-management-memory-region managing unit 125, an OS-non-management-memory-region managing unit (IOMEM) 127, an application program 129, a scanner data read program 131, and a data compression program 133.

Hereinafter, each of the above functional blocks will be described in further detail.

The scanner unit 111 scans image data and converts the image data into electronic data. The image data has a large size and successive memory regions should be defined for writing the image data into the memory regions. The DMA transfer unit writes the image data into the OS-non-management-memory region.

The HDD 113 is a secondary storage device including a rotating magnetic disk, and stores a program and/or data used to operate the image forming apparatus.

The DMA transfer unit 115 is a functional unit that can write and/or read data acquired through the scanner unit 111, for example, into and/or from the main memory 119 by bypassing a central processing unit (CPU) included in the control unit 120. Consequently, data can be transferred with high speed.

The print unit 117 is a functional unit configured to print image data onto a sheet of paper.

The main memory 119 is a storage device including a dynamic random access memory (DRAM). The main memory 119 stores the software 121 of the image forming apparatus 101, and writes and/or reads data as a primary storage device.

The control unit 120 includes a CPU and a peripheral control circuit, and controls operations of the image forming apparatus 101.

The software 121 is provided to govern the operations of the image forming apparatus 101, and includes an OS 123, an application program 129, and so forth.

The OS 123 is fundamental software provided to manage and/or control operations of the hardware and/or the software of the image forming apparatus 101. The OS 123 includes the OS-management-memory-region managing unit 125.

The OS-management-memory-region managing unit 125 defines and assigns a memory region managed by the OS, finds and acquires a free region upon receiving a request to use the memory, the request being transmitted from a program or the like, and frees the region when the use of the memory is finished. In a known memory management system, the entire memory space except part thereof, such as a region used for I/O, is managed by the OS-management-memory-region managing unit 125. However, in the image forming apparatus of the above-described embodiment, only a part of the region, which is used by the kernel, a program, and so forth, is managed by the OS-management-memory-region managing unit 125.

Further, the OS-management-memory-region managing unit 125 generates the window region, which is a common address space provided so that the OS side (kernel) can access the user space when the image forming apparatus 101 is started, and the kernel can access a non-managed region through the use of the window region.

The IOMEM (OS-non-management-memory-region managing unit; OS-non-management-region access means) 127 is the most characteristic functional unit according to an embodiment of the present invention. Namely, the IOMEM defines a memory region that is not managed by the OS (except the I/O region) and assigns the memory region (OS-non-management-memory region) to the virtual memory space. The IOMEM achieves the assignment by performing an MMAP operation so that the memory is defined and assigned. The hardware (including the scanner unit and/or the print unit) can directly access the above-described memory region through DMA, and a user program (the application program 129) can acquire (malloc( )) and/or free (free( )) the memory region via the IOMEM.

For example, the amount of image data or the like read through the scanner unit may be significantly large due to the image size, the resolution, the color depth, and so forth. Therefore, the user program (such as a scanner data read program 131, which will be described later) is made to acquire and/or free the memory region directly through the IOMEM so as to ensure a memory space including a sequence of the above-described large-capacity data items.

The application program 129 is a program used by the image forming apparatus 101 in performing operations. For example, the application program 129 includes the scanner data read program 131, a data compression program 133, and other programs that will be described in detail in the following items.

The scanner data read program 131 functions to make the DMA transfer unit 115 directly write large-capacity image data read by the scanner unit 111 into the main memory 119.

The data compression program 133 functions to compress data including image data or the like.

Figure 4A:
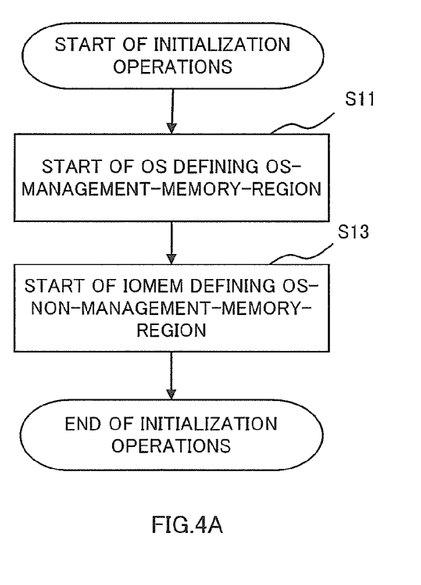

FIG. 4A shows a flowchart of initialization operations performed by the image forming apparatus 101 according to the above-described embodiment. Hereinafter, each of the operations will be described.

S11: When the power of the image forming apparatus 101 is turned on, the OS 123 starts operating and the OS-management-memory-region managing unit 125 defines part of the region of the main memory 119 as the OS-management memory region.

S13: The IOMEM 127 maps the remaining memory region from the main memory for the successive use of the large-capacity memory so that the large-capacity memory can be used by the user program.

Thus, a series of the above-described operations is performed to complete the memory initialization operations when the power is turned on.

Figure 4B:
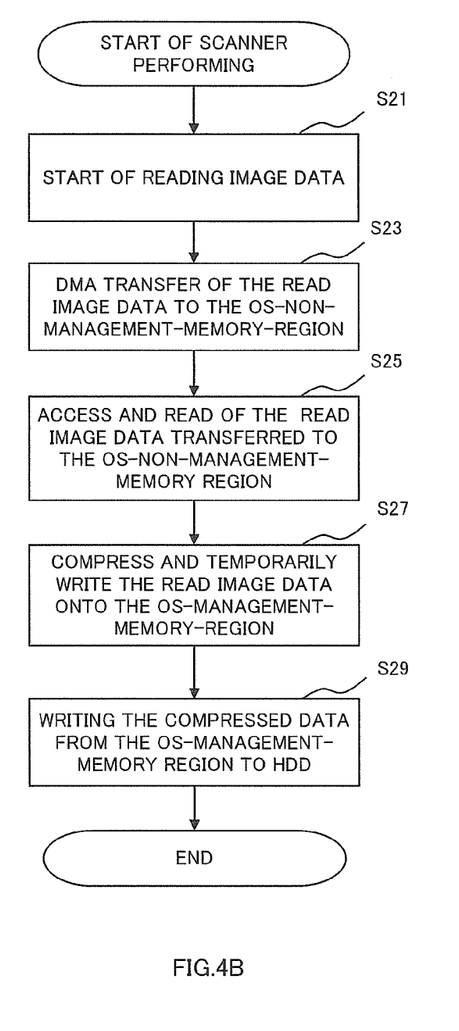
FIG. 4B is a flowchart provided for the above-described image forming apparatus showing operations performed when a scanner unit reads image data.
Figure 5:
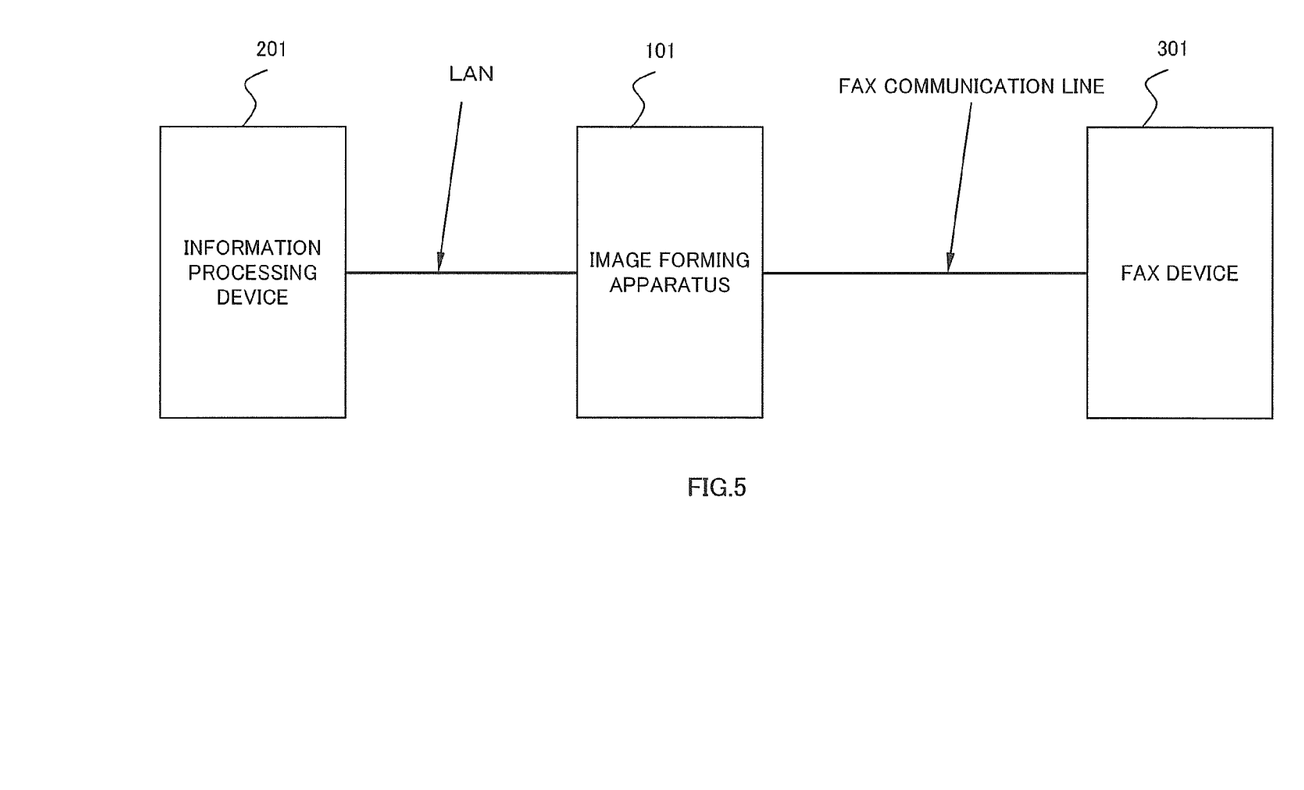
FIG. 5 shows communication relationships between an image forming apparatus, a facsimile device, and an information processing device according to an embodiment of the present invention.

FIG. 4B illustrates operations of the image forming apparatus 101 according to the above-described embodiment, the operations being performed to scan image data, for example, so as to describe how the memory of the image forming apparatus 101 is used.

S21: The scanner unit 111 starts reading the image data. At that time, the scanner data read program acquires large-capacity successive memory regions provided to write the image data thereon for an OS-non-management-memory region of the main memory 119 via the IOMEM 127.

S23: The DMA transfer unit 115 transfers the image data read during the operation performed at step S21 to the OS-non-management-memory region acquired at step S21.

S25: The data compression program 133 accesses and reads the image data transferred to the OS-non-management-memory region via the IOMEM 127.

S27: The data compression program 133 compresses the read image data and temporarily writes the compressed data onto the OS-management-memory region.

S29: The data compression program 133 writes the compressed data temporarily written at step S27 onto the HDD 113. The operations of steps S27 and S29 are performed in parallel and the data written onto the HDD is deleted from the memory. Therefore, the OS-management-memory region is not significantly consumed.

A series of the above-described operations allows for using the large-capacity OS-non-management-memory region defined by the IOMEM 127 through the DMA transfer unit 115, the scanner data read program 131, and the data compression program.

Thus, the use of the memory has been described through an example of the operations performed to scan the image data. However, the data acquired and handled by the OS-non-management-memory region, which is described with reference to step S21, is not limited to the above-described scanning embodiment. Hereinafter, different exemplary data that can be handled by the OS-non-management-memory region will be described.

The image forming apparatus further includes a universal serial bus (USB) connection unit configured to receive the image data transmitted from an externally connected USB memory.

The DMA transfer unit acquires the image data transmitted from the USB memory for the OS-non-management-memory region. The image data can be handled in the same way as the scanner data read at step S21.

According to another embodiment of the present invention, the image forming apparatus further includes a FAX reception unit configured to receive image data transmitted from a facsimile device provided outside the image forming apparatus via a FAX communication line.

Further, the image data transmitted to the FAX reception unit is DMA-transferred to the OS-non-management-memory region so that the image data can be handled in the same way as the scanner data read at step S21.

According to another embodiment of the present invention, the image forming apparatus further includes a print data reception unit configured to receive image data transmitted from an information processing device provided outside the image forming apparatus.

Then, the image forming apparatus receives the image data transmitted from the information processing device through the print data reception unit.

Further, the transmitted image data is DMA-transferred to the OS-non-management-memory region so that the image data can be handled in the same way as the scanner data read at step S21.

Namely, an image forming apparatus according to an embodiment of the present invention has the following functions.

A memory management device and an image forming apparatus according to an embodiment of the present invention can use successive large capacity memories by using the memory of an OS-non-management region without being affected by the restricted capacity of memory for acquisition and/or the occurrence of memory fragmentation, which is caused by an OS managing the entire memory region. Further, the OS-management-memory-region managing unit uses the window region so that the kernel can access a non-management region for debugging or the like.

The window region is provided to eliminate memory shared among the user space and the kernel space managed by the OS. Therefore, the problem of a virtual memory space consumed by the window region, which denotes redundant address spaces in the virtual memory space, is eliminated.

If the entire memory region is managed by the OS, the memory region acquisition (malloc( )) is restricted by the OS so that the capacity size of the memory region for acquisition is often limited. However, the above-described limitation is eliminated through the use of the IOMEM.

The fragmentation occurs in the memory region managed by the OS, and the successive memory regions are often acquired with difficulty even though the capacity size of the memory for acquisition does not exceed the above-described limit. However, when the memory acquisition is controlled on the user program (application program) side through the use of the IOMEM, occurrence of fragmentation or the like is reduced and successive large-capacity memory spaces can be acquired.

The OS-non-management region can be accessed from the OS side (e.g., the kernel) via the window region. Therefore, the kernel can access the non-management region for debugging or the like.

Thus, in the above-described embodiments, an image forming apparatus has been described. However, without being limited to the image forming apparatus, the present invention can be used as a memory management device provided in other electronic devices that include memory.

Further, the window region of an image forming apparatus according to an embodiment of the present invention may be limited to only acquire and/or free predetermined information used to refer to a predetermined region included in a non-management region.

Therefore, the size of the window region may be reduced to the minimum. Further, it becomes possible to keep an address space defined in the window region and a real memory from overlapping, which prevents the memory region from being compressed, so as to make effective use of a real memory space.

Further, an image forming apparatus according to an embodiment of the present invention may include a DMA transfer unit provided so that hardware can directly access the memory space of the non-management region.

Therefore, data can be read from and/or written into the memory of the non-management region with high speed through the use of high-speed memory access attained by the DMA transfer.

Further, an image forming apparatus according to an embodiment of the present invention may include a print unit configured to print image data that is written into the non-management region and that is transferred through the DMA transfer unit.

Therefore, the above-described configuration ensures a large-capacity data region for image data for printing and high-speed transferring of the image data. Consequently, the high-speed data transfers utilized by state-of-the-art, highly sophisticated print units are attained.

Further, an image forming apparatus according to an embodiment of the present invention may include a scanner unit configured to read an image and convert the image into image data. The DMA transfer unit may then write the converted image data onto the non-management region through the DMA transfer.

Consequently, large-capacity image data obtained through the scanner can be processed with high speed.

Further, image data received through the USB connection unit can be processed with high speed as is the case with the scanned data.

Further, image data received through the FAX reception unit can be processed with high speed.

Further, image data received through the print data reception unit can be processed with high speed.

Although embodiments of the present invention have been described with reference to the accompanying drawings above, the present invention should not be limited to the above-described embodiments. Various modifications and alterations can be made to the above-described embodiments within the scope of the present invention and the scope of the equivalence thereof.

What is claimed is:

1. A memory management device that has a virtual memory space and that manages a memory region, the memory management device comprising:
    an OS-management-memory-region managing unit configured to divide a physical memory space into a management region that can be managed by an OS and a non-management region that is not managed by the OS, assign the management region to the virtual memory space, and perform at least one of acquiring and freeing a memory space included in the management region;
    an OS-non-management-memory-region managing unit configured to assign the non-management region to the virtual memory space so that an application program performs at least one of acquiring and freeing a memory space included in the non-management region; and
    a window region provided to cause the OS-management-memory-region managing unit to refer the OS to the non-management region,
    wherein data is read from and written into the non-management region of the physical memory space via the window region.

2. An image forming apparatus comprising:

an OS-management-memory-region managing unit configured to divide a physical memory space into a management region that can be managed by an OS and a non-management region that is not managed by the OS, assign the management region to a virtual memory space, and perform at least one of acquiring and freeing a memory space included in the management region;

an OS-non-management-memory-region managing unit configured to assign the non-management region to the virtual memory space so that an application program perform at least one of acquiring and freeing a memory space included in the non-management region; and a window region provided so that the OS-management-memory-region managing unit makes the OS refer to the non-management region, wherein data is read from and written into the OS-non-management region of the physical memory space via the window region.

3. The image forming apparatus according to claim 2, further comprising:

a DMA transfer unit configured so that hardware can directly access a memory space of the non-management region.

4. The image forming apparatus according to claim 3, further comprising:

a scanner unit configured to read and convert an image into image data, wherein the DMA transfer unit writes the converted image data onto the non-management region through DMA-transfer.

5. The image forming apparatus according to claim 3, further comprising:

a universal-serial-bus connection unit configured to receive image data transmitted from an externally connected universal-serial-bus memory, wherein the DMA transfer unit writes the received image data onto the non-management region through DMA-transfer.

6. The image forming apparatus according to claim 3, further comprising:

a facsimile reception unit configured to receive image data transmitted through a facsimile communication line, wherein the DMA transfer unit writes the received image data onto the non-management region through DMA-transfer.

7. The image forming apparatus according to claim 3, further comprising:

a print data reception unit configured to receive image data transmitted from an information processing device provided outside the image forming apparatus, wherein the DMA transfer unit writes the received image data onto the non-management region through DMA-transfer.

8. An image forming method comprising:

an OS-management-memory-region managing step performed to divide a physical memory space into a management region that can be managed by an OS and a non-management region that is not managed by the OS, assign the management region to a virtual memory space, and perform at least one of acquiring and freeing a memory space included in the management region;

an OS-non-management-memory-region managing step performed to assign the non-management region to the virtual memory space so that an application program performs at least one of acquiring and freeing a memory space included in the non-management region; and a window region referring step performed so that the OS refers to the non-management region in a window region included in an OS-management-memory region, wherein data is read from and/or written into the OS-non-management region of the physical memory space via the window region.

9. The image forming method according to claim 8, further comprising:

a DMA transfer step performed so that hardware can directly access a memory space of the non-management region.

10. The image forming method according to claim 9, further comprising:

a scanner step performed to read and convert image into image data, wherein, at the DMA transfer step, the converted image data is written onto the non-management region through DMA-transfer.

11. The image forming method according to claim 9, further comprising:

a universal-serial-bus reception step performed to receive image data transmitted from a universal-serial-bus memory connected from outside an image forming apparatus, wherein, at the DMA transfer step, the received image data is written onto the non-management region through DMA-transfer.

12. The image forming method according to claim 9, further comprising:

a facsimile reception step performed to receive image data transmitted through a facsimile communication line, wherein, at the DMA transfer step, the received image data is written onto the non-management region through DMA-transfer.

13. The image forming method according to claim 9, further comprising:

a print data reception step performed to receive image data transmitted from an information processing device provided outside an image forming apparatus, wherein, at the DMA transfer step, the received image data is written onto the non-management region through DMA-transfer.

* * * * *